Sept. 4, 1923. 1,466,946
H. BRUNKA
FLUSH VALVE
Filed Sept. 29, 1922 2 Sheets-Sheet 2
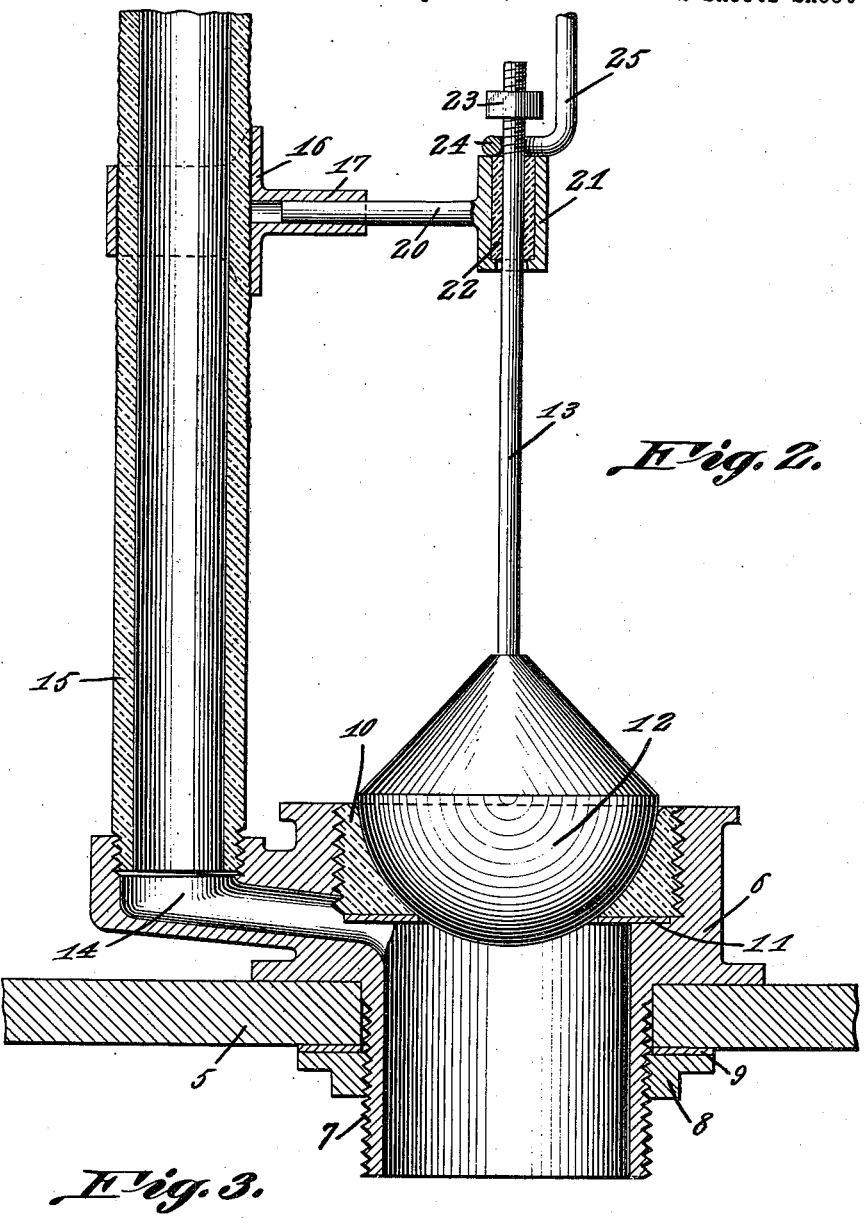
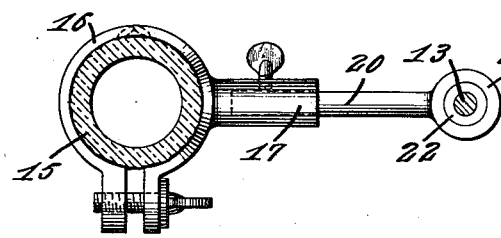
H. Brunka, Inventor Patented Sept. 4, 1923.

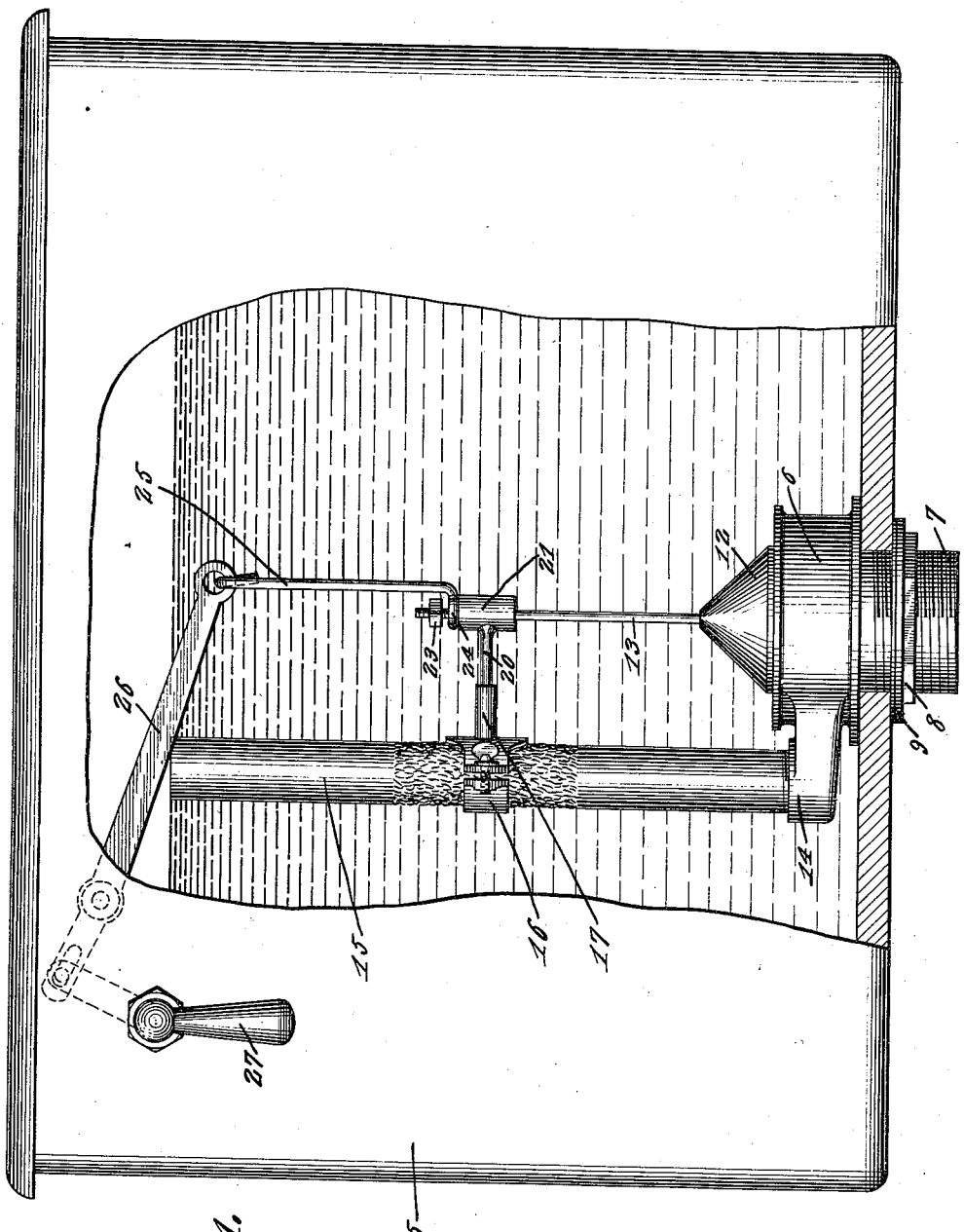

1,466,946

UNITED STATES PATENT OFFICE.

HERMAN BRUNKA, OF MARION, INDIANA.

FLUSH VALVE.

Application filed September 29, 1922. Serial No. 591,331.

*To all whom it may concern:*

Be it known that I, HERMAN BRUNKA, a citizen of the United States, residing at Marion, in the county of Grant and State of Indiana, have invented a new and useful Flush Valve, of which the following is a specification.

This invention has reference to valve constructions, and more particularly to valve constructions especially designed for use in flush tanks, the primary object of the invention being to lengthen the life of the valve mechanism by eliminating deterioration due to corrosion.

Another object of the invention is to provide a novel form of bearing for the valve rod that supports the usual ball valve, to insure a true seating of the ball valve.

With the foregoing and other objects in view which will appear as the description proceeds, the invention resides in the combination and arrangement of parts and in the details of construction herein disclosed and claimed, it being understood that changes in the precise embodiment of the invention herein disclosed, may be made within the scope of what is claimed, without departing from the spirit of the invention.

Referring to the drawings:—

Figure 1 is a side elevational view of a flush tank equipped with a valve mechanism constructed in accordance with the invention, a portion of the tank being broken away.

Figure 2 is a longitudinal sectional view through a valve mechanism constructed in accordance with the present invention.

Figure 3 is a plan view of the supporting bracket and adjustable arm forming a part of the valve mechanism.

Referring to the drawings in detail, the reference character 5 designates a flush tank, which is formed with the usual opening to accommodate the valve body portion 6 which is formed with a threaded extension 7, disposed in the opening of the flush tank. Positioned on the extension 7 is a threaded member 8 which supports the washer 9 which is designed to provide a fluid-tight connection between the flush tank and the valve body.

The valve body is formed with an enlarged threaded opening adapted to accommodate the valve seat 10 which is formed of glass and threaded to be positioned in the threaded opening, there being provided a gasket 11 disposed between the valve seat and valve body, to insure a tight connection therebetween. The valve seat is formed with an opening, the wall thereof being curved to conform to the curvature of the valve member 12, which is of the usual rubber ball type having a suitable opening to accommodate the supporting rod 13.

An overflow opening indicated at 14 is formed through the valve body and is provided with a threaded wall to accommodate the threaded extremity of the overflow pipe 15, which is also formed of glass material one portion thereof being roughened to accommodate the band 16 that encircles the overflow pipe. This band 16 is provided with an extension 17 that is hollow to receive the arm 20 that carries the bearing member 21 at one end thereof, the bearing member 21 being constructed to accommodate the glass bearing 22 that is tubular in formation to accommodate the rod 13.

Positioned on the upper end of the rod 13 is a nut 23 that provides a stop for the right angled extremity 24 of the operating rod 25, which operating rod has connection with the lever 26 pivotally supported within the tank and which is moved by means of the handle 27, to accomplish the operation of the valve 12 in the usual and well known manner to allow the water within the tank to pass therefrom.

From the foregoing it will be seen that due to this construction, corrosion of the parts of the valve mechanism is reduced to a minimum, and true operation of the elements is assured.

Having thus described the invention, what is claimed as new is:—

In a device of the character described, a valve body, a removable glass valve seat supported by the valve body and having an overflow opening, a glass overflow pipe positioned in the overflow opening, said overflow pipe having a roughened surface, a band secured to the overflow pipe at the roughened surface thereof, an arm supported by the band and carrying a bearing member, a glass bearing in the bearing member, a ball valve cooperating with the removable valve seat, and a controlling rod having connection with the ball valve and movable through the glass bearing member.

In testimony that I claim the foregoing as my own, I have hereto affixed my signature in the presence of two witnesses.

HERMAN BRUNKA.

Witnesses:
J. S. SISSON,
G. L. STUMP.